(12) United States Patent
Ito et al.

(10) Patent No.: US 9,039,588 B2
(45) Date of Patent: May 26, 2015

(54) COMBINATION MACHINING LATHE

(75) Inventors: Takaharu Ito, Aichi (JP); Kouta Ashiuchi, Aichi (JP); Norio Kamegai, Aichi (JP); Noriyoshi Ito, Aichi (JP); Takuya Kato, Aichi (JP)

(73) Assignee: Okuma Corporation, Niwa-gun (JP)

( * ) Notice: Subject to any disclaimer, the term of this patent is extended or adjusted under 35 U.S.C. 154(b) by 869 days.

(21) Appl. No.: 12/581,504

(22) Filed: Oct. 19, 2009

(65) Prior Publication Data

US 2010/0101383 A1    Apr. 29, 2010

(30) Foreign Application Priority Data

Oct. 28, 2008  (JP) ................................. 2008-277137

(51) Int. Cl.
*B23Q 3/155* (2006.01)
*B23P 23/02* (2006.01)
(Continued)

(52) U.S. Cl.
CPC ......... *B23Q 3/1574* (2013.01); *Y10T 483/1707* (2015.01); *Y10T 29/5114* (2015.01); *Y10T 483/1714* (2015.01); *Y10T 82/2508* (2015.01); *Y10T 82/2506* (2015.01); *B23B 3/065* (2013.01); *Y10T 82/2531* (2015.01); *Y10T 483/1705* (2015.01); *Y10T 82/2502* (2015.01);
(Continued)

(58) Field of Classification Search
CPC ........ B23B 3/065; B23B 11/00; B23B 3/162; B23Q 3/15573; B23P 23/02; Y10T 483/1702; Y10T 483/1705; Y10T 483/1707; Y10T 483/1714; Y10T 29/5109; Y10T 29/5114; Y10T 82/2502; Y10T 82/2512; Y10T 82/2531; Y10T 82/2541; Y10T 409/305656

USPC ............... 483/17, 18, 19, 22; 29/27 R, 27 C; 82/118, 123, 132, 137; 409/165
See application file for complete search history.

(56) References Cited

U.S. PATENT DOCUMENTS 4,038,740 A * 8/1977 Grinage ........................ 483/26
4,428,109 A * 1/1984 Seeger ............................ 483/24
(Continued)

FOREIGN PATENT DOCUMENTS

CN     101306475 A    5/2008
CN     101206470 A    6/2008
(Continued)

OTHER PUBLICATIONS

Machine Translation of JP 2000-254802 (which JP '802 was published Sep. 2000).*

(Continued)

*Primary Examiner* — Erica E Cadugan
(74) *Attorney, Agent, or Firm* — Arent Fox LLP

(57) ABSTRACT

In a combination machining lathe, a workpiece holding device holds a workpiece in a manner that permits the workpiece to rotate around an axis parallel to a direction of a horizontal Z axis. A tool post holds a tool that comprises a holder and a bit. The tool held by the tool post is indexed to a position in which the longitudinal axis of the holder is parallel to an X axis direction. The bit of the tool held by the tool post is angled such that a longitudinal axis of the bit is disposed in a position tilted away from the X axis direction closer to a horizontal axis in a plane containing the X axis and the Y axis. A turning operation is performed while the tool and/or the workpiece are moved relative to each other in a direction of the longitudinal axis of the bit.

3 Claims, 9 Drawing Sheets

(51) Int. Cl.
  *B23B 11/00* (2006.01)
  *B23Q 3/157* (2006.01)
  *B23B 3/06* (2006.01)
  *B23B 3/18* (2006.01)

(52) U.S. Cl.
  CPC ............... *B23B 11/00* (2013.01); *B23P 23/02* (2013.01); *B23Q 3/15573* (2013.01); *B23B 3/06* (2013.01); *B23Q 3/15713* (2013.01)

(56) References Cited

U.S. PATENT DOCUMENTS

| | | | | |
|---|---|---|---|---|
| 4,459,738 | A * | 7/1984 | Buchmann | 483/19 |
| 7,237,310 | B2 * | 7/2007 | Sasazawa et al. | 29/27 C |
| 2007/0246899 | A1 * | 10/2007 | Haimer | 279/9.1 |
| 2008/0282854 | A1 * | 11/2008 | Momoi et al. | 82/1.11 |

FOREIGN PATENT DOCUMENTS

| | | | |
|---|---|---|---|
| JP | 2000-126953 A | * | 5/2000 |
| JP | 2000-254802 A | | 9/2000 |
| JP | 2008-284641 | | 11/2008 |

OTHER PUBLICATIONS

Machine Translation JP-2000-126953, which JP '953 was published May 2000.*

Notification of Reasons for Refusal issued by Japanese Patent Office in corresponding Japanese Application 2008-277137, dated Mar. 25, 2013.

Chinese Office Action issued in counterpart Chinese Patent Application 200910208091.7 dated May 9, 2013.

* cited by examiner

Fig. 8

At least one of the tool post and the workpiece holding device being configured to be movable to allow relative movement of the tool held by the tool post and the workpiece held by the workpiece holding device in three directions of an X axis, a Y axis, and the Z axis; a controller configured to control the relative movement of the tool and the workpiece held by the workpiece holding device, and the operation of the tool post indexing the tool, whereby a turning operation on the workpiece is performed by the bit, when the tool is in the position wherein the longitudinal axis of the tool holder is parallel to the X axis direction, while the tool and/or the workpiece are moved relative to each other in a direction of the longitudinal axis of the bit.

Fig. 9

At least one of the tool post and the workpiece holding device being configured to be movable to allow relative movement of the tool held by the tool post and the workpiece held by the workpiece holding device in three directions of an X axis, a Y axis, and the Z axis; a controller configured to control the relative movement of the tool and the workpiece held by the workpiece holding device, and the operation of the tool post indexing the tool, whereby a turning operation on the workpiece is performed by the bit, when the tool is in the position wherein the longitudinal axis of the tool holder is parallel to the X axis direction, while the tool and/or the workpiece are moved relative to each other in a direction of the longitudinal axis of the bit; wherein the tool post is an indexable turret configured to hold plural tools.

COMBINATION MACHINING LATHE

BACKGROUND OF THE INVENTION

This application claims the benefit of Japanese Patent Application Number 2008-277137 filed on Oct. 28, 2008, the entirety of which is incorporated by reference.

TECHNICAL FIELD

This invention relates to a combination machining lathe comprising a tool post in which a tool is installable wherein the tool post is movable in tri-axial directions.

BACKGROUND ART

A prevailing combination machining lathe hitherto known in the art typically comprises a tool post in which a tool of various kinds is installable, and the tool post is configured to be movable in tri-axial directions (e.g., along three rectangular axes of X axis, Y axis and Z axis). In the majority of the combination machining lathes of this type, the tool post is fed in upward/downward directions or directions tilted with respect to the horizontal plane so that the tool enters a workpiece to perform a turning operation. However, when the tool post is fed in an upward/downward direction or a direction tilted with respect to the horizontal plane, disadvantageously, the flexure of the workpiece caused by gravity under its own weight would greatly affect the machining accuracy. In particular, when the tool post is fed vertically, the amount of flexure would directly reflect the dimension errors. Against the backdrop, the applicant of this application for the present invention previously proposed a combination machining lathe as described in JP 2000-254802 A, in an effort to achieve a higher accuracy machining.

Referring now to FIG. 7, a conventional combination machining lathe 30 will be described herein. FIG. 7 is a schematic diagram showing the combination machining lathe 30 according to the applicant's own prior invention.

In the combination machining lathe 30, a carriage 32 is mounted on a bed 31 and configured to be slidable in a Z axis direction (rightward and leftward); a cross slide 33 is mounted on the carriage 32 and configured to be slidable in a Y axis direction perpendicular to the Z axis (forward and backward); and a tool post 34 is mounted at a front face of the cross slide 33 and configured to be slidable in an X axis direction (upward and downward). The tool post 34 is provided with two tool mount portions, one for holding a tool 35 with its holder oriented in the X axis direction, and the other for holding a tool 36 with its holder oriented in the Y axis direction. Each tool 35, 36 comprises the holder and a bit. The holder of the tool 35 as mounted in the tool mount portion of the tool post 34 has a longitudinal axis extending in the X axis direction while the holder of the tool 36 as mounted in the tool mount portion of the tool post 34 has a longitudinal axis extending in the Y axis direction. The bit of each tool 35, 36 is provided at an end, lengthwise, of the corresponding holder. The tools 35 and 36 are each designed such that the longitudinal axis of the bit is parallel to the longitudinal axis of the corresponding holder. Thus, the direction of the longitudinal axis of the bit of the tool 35 is oriented in the X axis direction, while the direction of the longitudinal axis of the bit of the tool 36 is oriented in the Y axis direction.

It is understood that the combination machining lathe 30 further comprises a head stock and a tail stock, although neither illustrated, which are configured to hold a workpiece W in a manner that permits the workpiece W to rotate around an axis C parallel to the Z axis direction.

With the combination machining lathe 30 described above, in normal operation, the tool post 34 is fed in the X axis direction toward a workpiece W that is being rotated, so that a turning operation is performed by the tool 35 with its point of working set at a top of the workpiece W. On the other hand, in cases where a heavier workpiece is worked and/or a higher accuracy machining is required, the tool post 34 is fed in the Y axis direction toward a workpiece W that is being rotated, so that a turning operation is performed by the tool 36 with its point of working set at a horizontal point of the workpiece W.

Generally, it would be desirable in some instances that the in-feed direction of the tool post of the combination machining lathe be changed according to the conditions such as the shape of a workpiece to be worked, limitations on the space available for the machining operation, etc. However, in the aforementioned combination machining lathe 30, the in-feed direction of the tool post is restricted to either of the vertical direction (parallel to the X axis) or the horizontal direction (parallel to the Y axis), and thus there would be cases where the tool post could not be fed in the most desirable direction conceivable. Furthermore, according to the conventional combination machining lathes, the longitudinal axis of the tool bit is designed to be parallel to the longitudinal axis of its holder, and thus the in-feed direction of the tool post is, logically, parallel to the direction in which the tool (holder) is held. Therefore, in order to realize a combination machining lathe in which the in-feed direction of the tool post can be changed according to the various conditions, many tool mount portions need to be provided in the tool post, each for holding a tool in a different direction, and thus would inevitably upsize the tool post to an impractically great extent.

Thus, there is a need to provide a combination machining lathe in which a tool post can be fed in the most desirable or ideal direction according to the conditions such as the shape of a workpiece to be worked, limitations on the space available for the machining operation, etc.

The present invention has been made in an attempt to eliminate the above disadvantages, and illustrative, non-limiting embodiments of the present invention may overcome the above disadvantages and other disadvantages not described above.

SUMMARY OF INVENTION

A first aspect of the present invention is to provide a combination machining lathe which comprises:

a workpiece holding device configured to hold a workpiece in a manner that permits the workpiece to rotate around an axis parallel to a direction of a horizontal Z axis;

a tool post configured to hold a tool that comprises a holder and a bit, the holder having a longitudinal axis extending lengthwise, the bit being provided at an end, lengthwise, of the holder, at least one of the tool post and the workpiece holding device being configured to be movable to allow relative movement of the tool held by the tool post and the workpiece held by the workpiece holding device in three directions of an X axis, a Y axis and the Z axis, the X axis being perpendicular to the Z axis, the Y axis being perpendicular to the Z axis and to the X axis, the tool post being configured to perform an operation of indexing the tool held thereby to a position in which the longitudinal axis of the holder is parallel to the X axis direction, wherein the bit of the tool held by the tool post is angled such that a longitudinal axis of the bit is disposed in a position tilted away from the X axis direction closer to a horizontal axis in a plane containing the X axis and the Y axis; and a controller configured to control the relative movement of the tool and the workpiece held by the workpiece holding device, and the operation of the tool post indexing the tool, whereby a turning operation is performed while the tool and/or the workpiece are moved relative to each other in a direction of the longitudinal axis of the bit.

In a second aspect of the present invention, the combination machining lathe configured as described above in the first aspect may further comprise a tool exchanger for use in replacing one tool with another tool to be held by the tool post. With this additional feature, the controller may be configured to change a direction of the relative movement of the tool and/or the workpiece in accordance with a direction of the longitudinal axis of the bit of the tool which is held by the tool post and of which the direction of the longitudinal axis of the bit with respect to that of the holder is different from that of the tool replaced using the tool exchanger.

In the combination machining lathe configured as described above in the first aspect, the tool post in a third aspect of the present invention may be a turret configured to hold a plurality of tools of which directions of longitudinal axes of bits with respect to those of corresponding holders are different from each other. The turret is rotatable around the Z axis, and the tool post's indexing operation may be performed by rotating the turret to a position in which a longitudinal axis of a holder of one of the tools is parallel to the X axis direction. With this additional feature, the controller may be configured to change a direction of the relative movement of the one of the tools and/or the workpiece in accordance with a direction of a longitudinal axis of a bit of the one of the tools.

Various implementations according to the present invention as will be described later in detail can achieve several advantageous effects as follows:

According to the configuration described above in the first aspect, the bit of the tool held by the tool post is angled such that the longitudinal axis of the bit is disposed in a position tilted away from the X axis direction and closer to the horizontal axis in the plane containing the X axis and the Y axis, and the controller can perform the turning operation while causing the tool and/or the workpiece to be moved relative to each other in the direction of the longitudinal axis of the bit in accordance with the shape and/or weight and/or the like of the workpiece. Therefore, if an appropriate tool with a bit of which the longitudinal axis is oriented in a desirable direction is held by the tool post in accordance with the shape, weight and the like of the workpiece, then the turning operation can be performed with the tool post fed inwardly of the workpiece in the direction of the longitudinal axis of the bit, so that the machining can be carried out with increased accuracy. Furthermore, in this configuration, the tool post should not necessarily be provided with two or more tool mount portions or the like designed to hold the tool in directions different from each other, so that the turning operation performed while changing the in-feed direction of the tool can be made possible without upsizing the tool post and the lathe as a whole.

According to the configuration with the additional feature described above in the second aspect, with the help of the tool exchanger for use in replacing one tool with another tool to be held by the tool post, the direction of the longitudinal axis of the bit of the tool held by the tool post can be exchanged with a new tool having a different direction of the longitudinal axis of the bit, whereas the controller is configured to change the direction of the relative movement of the tool and/or the workpiece in accordance with the direction of the longitudinal axis of the exchanged new tool held by the tool post. The use of the tool exchanger enables to change the direction of the longitudinal axis of the bit and thus ease of use and efficiency in operation can be achieved.

On the other hand, according to the configuration with the additional feature described above in the third aspect, the tool post is a turret configured to be capable of holding a plurality of tools of which directions of longitudinal axes of bits with respect to those of corresponding holders are different from each other, the turret being rotatable around the Z axis, the tool post's indexing operation being performed by rotating the turret to a position in which a longitudinal axis of a holder of one of the tools is parallel to the X axis direction, whereas the controller is configured to change a direction of the relative movement of the one of the tools and/or the workpiece in accordance with a direction of a longitudinal axis of a bit of the indexed one of the tools. Therefore, the tool exchanger is not required, so that downsizing of the lathe as a whole can be achieved. Furthermore, upon changing the in-feed direction, the tool can be exchanged more swiftly in comparison with the alternative configuration in which the tool is replaced using the tool exchanger, and thus the efficiency in operation can be improved.

BRIEF DESCRIPTION OF THE DRAWINGS

The above aspect, other advantages and further features of the present invention will become more apparent by describing in detail illustrative, non-limiting embodiments thereof with reference to the accompanying drawings, in which:

FIG. 8 is a schematic representation encompassing alternative movement configurations; and FIG. 9 is a schematic representation of an embodiment with a turret and having relative movement between the tool and the workpiece in three orthogonal directions.

DESCRIPTION OF EMBODIMENTS

Exemplary embodiments of the present invention will be described hereinafter with reference to the accompanying drawings.

Figure 1:
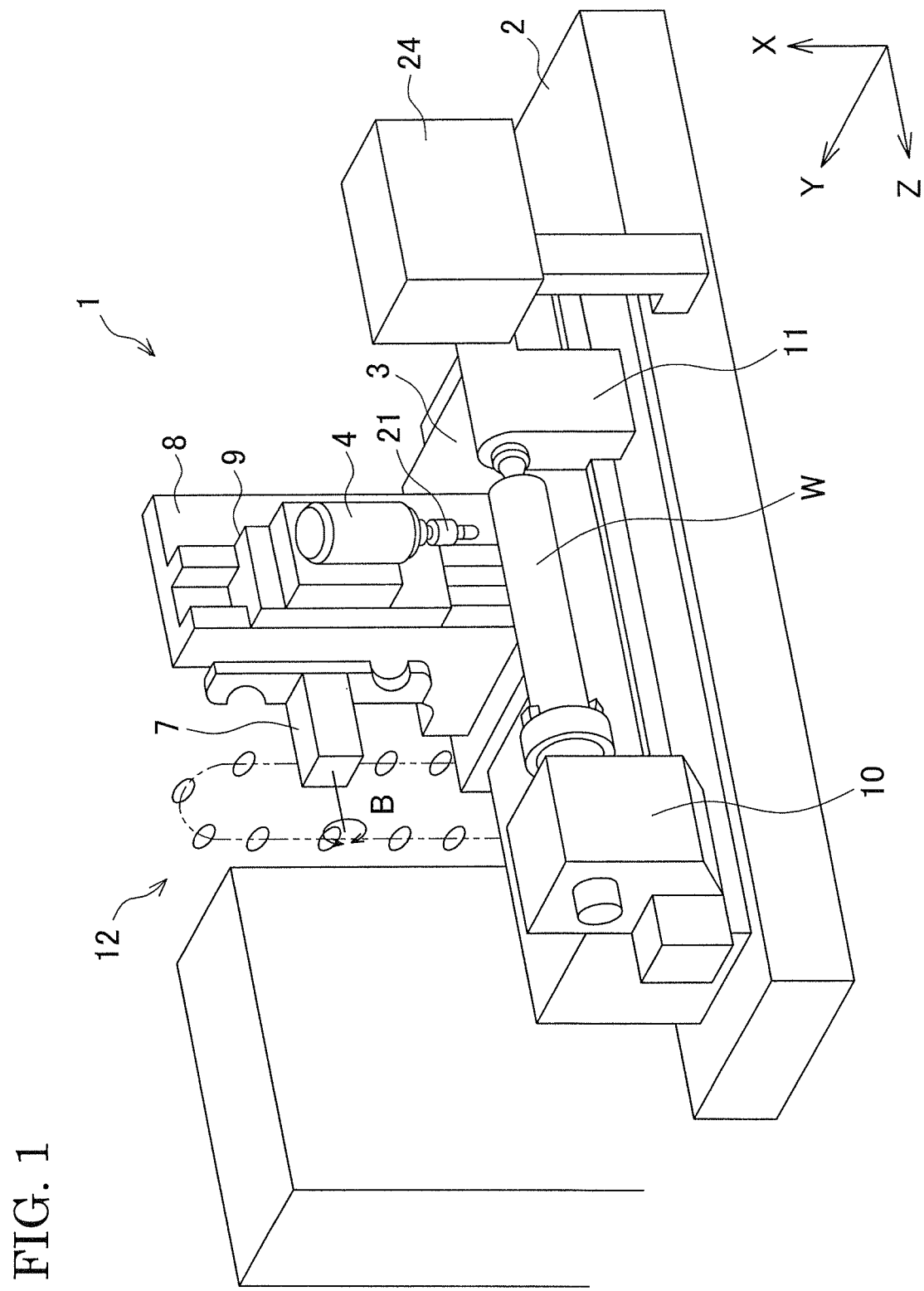
FIG. 1 is an overall view of a combination machining lathe according to an exemplary embodiment of the present invention.
Figure 2:
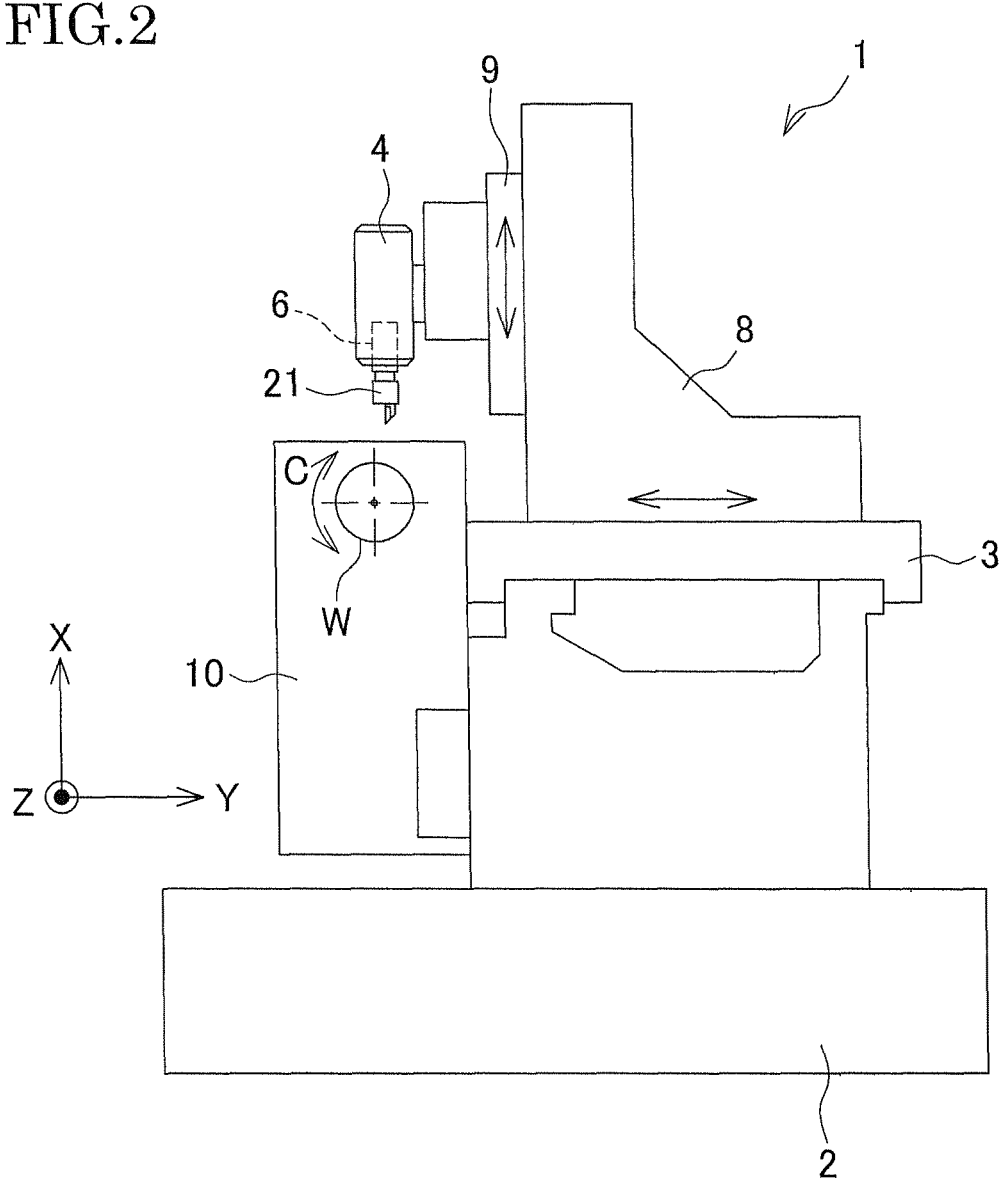
FIG. 2 is a schematic diagram of the combination machining lathe as viewed from the Z axis direction.

First, referring to FIGS. 1 and 2, a general structure of a combination machining lathe 1 according to one exemplary embodiment of the present invention will be described. The combination machining lathe 1 comprises a bed 2, a carriage 3 mounted on the bed 2 and configured to be slidable along the bed 2 in a Z axis direction (rightward and leftward), a cross slide 8 mounted on the carriage 3 and configured to be slidable along the carriage 3 in a Y axis direction perpendicular to the Z axis (forward and backward), and a lift 9 mounted at a front surface of the cross slide 8 and configured to be slidable along the cross slide 8 in an X axis direction perpendicular to the Y axis and to the Z axis (upward and downward). The combination machining lathe 1 further comprises a tool post 4 mounted at a front surface of the lift 9 and configured to hold a tool 21. Moreover, a head stock 10 and a tail stock 11 are provided in front of the cross slide 8 to operate together as a workpiece holding device and configured to hold a workpiece W in a manner that permits the workpiece W to rotate around a C axis parallel to the Z axis. In addition, an exchanging arm 7 configured to be slidable in the Z axis direction and rotatable around a B axis parallel to the Z axis is provided at a position leftward of the cross slide 8 to thereby replace one tool 21 with another to be held by the tool post 4. Operations of the carriage 3, cross slide 8, lift 9, head stock 10, tail stock 11, exchanging arm 7 and other components of the combination machining lathe 1 are controlled by an NC unit 24 (controller). Denoted by reference numeral 12 is a tool magazine configured to store a plurality of tools of various kinds.

Figure 3:
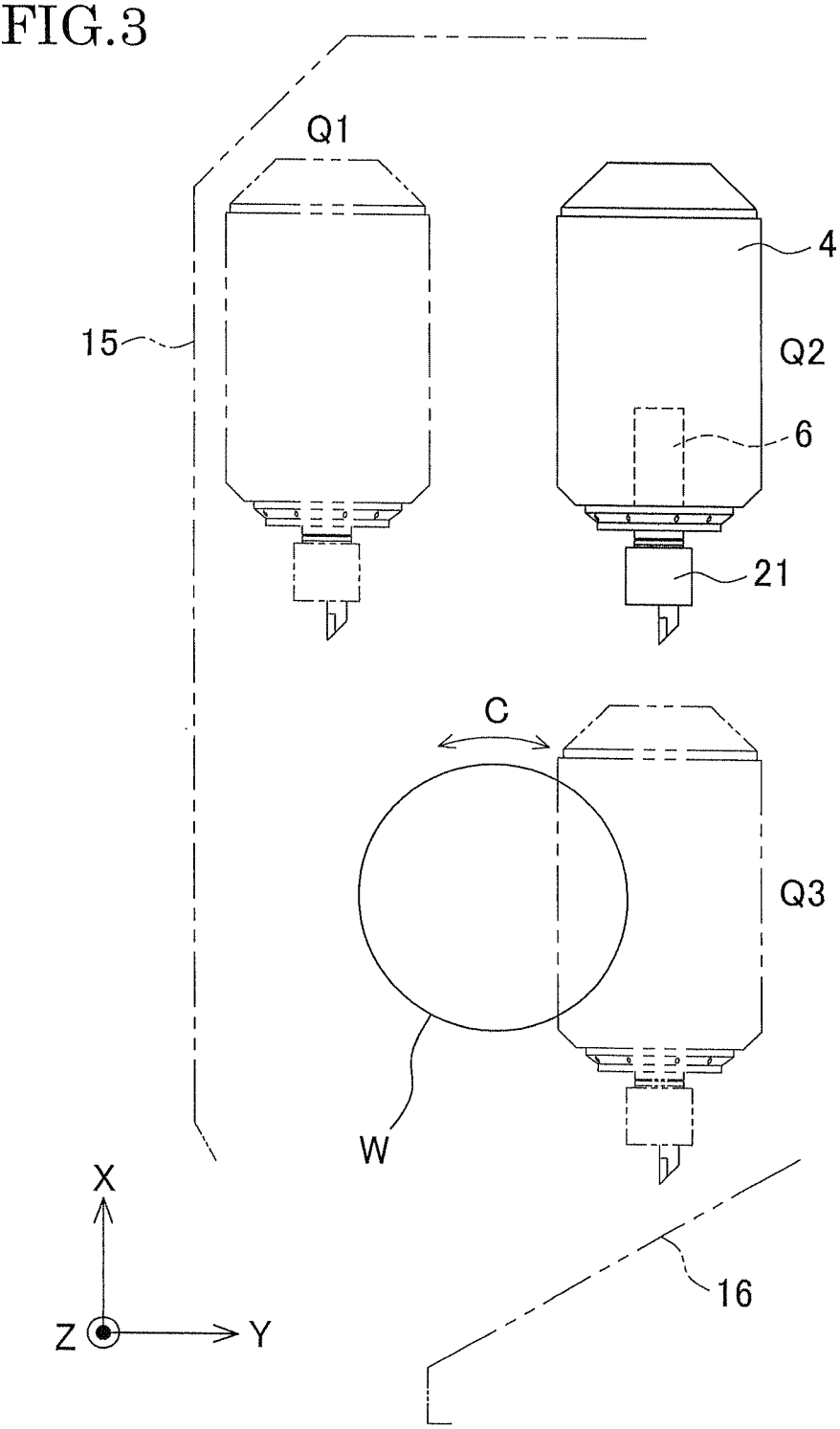
FIG. 3 is a schematic diagram of a tool post for illustrating a range of movement thereof.
Figure 4:
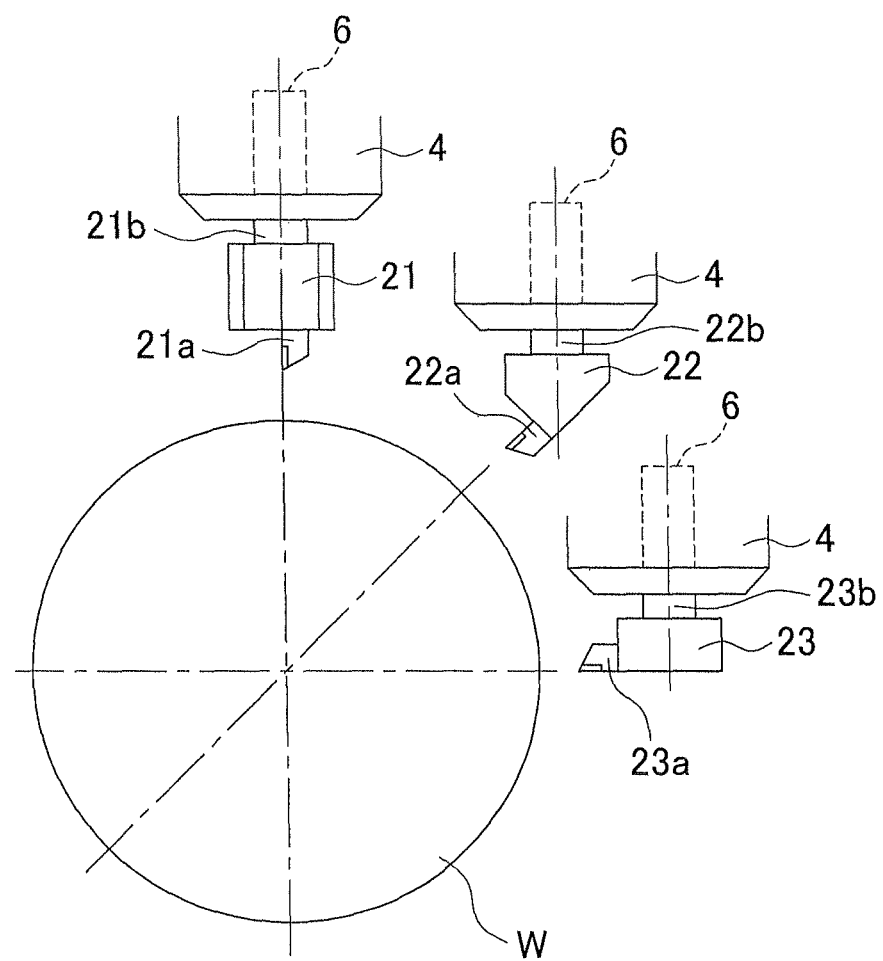
FIG. 4 is a schematic diagram showing the change in in-feed direction effected by the exchange of a tool and the movement of the tool post relative to a workpiece.

The next discussion is directed to the tool post 4, which will be described with reference to FIGS. 3 and 4.

The tool post 4 comprises a tool mount portion 6 configured to receive and hold a tool (e.g., one of tools 21, 22, 23) that comprises a bit (21a, 22a, 23a) and a holder (21b, 22b, 23b). Each holder 21b, 22b, 23b has a longitudinal axis extending lengthwise, and the bit 21a, 22a, 23a is provided at an end, lengthwise (in the direction of the longitudinal axis), of the corresponding holder 21b, 22b, 23b. The tool mount portion 6 is designed to be capable of receiving the holder 21b, 22b, 23b of any of the tools 21, 22, 23 of various types of which the bits 21a, 22a, 23a are different from each other for example in shape, direction of the longitudinal axis with respect to that of the holder 21b, 22b, 23b, or the like. Moreover, the tool post 4 is configured to move in the Y axis direction between positions Q1 and Q2 and in the X axis direction between positions Q2 and Q3, when the cross slide 8 and the lift 9 are moved, respectively. In FIG. 3, denoted by reference numeral 15 is a door member configured to close a machining space, and denoted by reference numeral 16 is a protective cover configured to protect a sliding surface of the tail stock 11. In actuality, the door member 15 and the protective cover 16 are provided in the combination machining lathe 1, though neither of them is shown in FIGS. 1 and 2.

Next, a turning operation performed with the above-described combination machining lathe 1 will be described hereafter.

In the normal operation of the combination machining lathe 1, first, a tool 21 of which the longitudinal axis of the bit 21a is parallel to the longitudinal axis of the holder 21b is installed in the tool post 4, and the tool 21 is indexed to a position in which the longitudinal axis of the holder 21b is parallel to the X axis direction. Thereafter, the lift 9 is moved upward or downward. In this way, the tool post 4 is fed in the X axis direction that is the direction of the longitudinal axis of the bit 21a, into a workpiece W that is being rotated, so that the turning operation is performed by the tool 21 with its point of working set at a top of the workpiece W. On the other hand, in cases where a heavier workpiece W is worked and/or a higher accuracy machining is required, the tool 21 held by the tool post 4 is exchanged to the tool 23 by operating the exchanging arm 7. The tool 23 has the holder 23b and the bit 23a which is provided on the holder 23b and of which the longitudinal axis is perpendicular to that of the holder 23b. When the tool 23 held by the tool post 4 is indexed to a position in which the longitudinal axis of the holder 23b is parallel to the X axis direction, the longitudinal axis of the bit 23a becomes parallel to the Y axis direction. In operation, first, the tool 23 configured as described above is installed in the tool post 4, and the tool 23 held by the tool post 4 is indexed until the longitudinal axis of the holder 23b is oriented in a direction parallel to the X axis. Thereafter, the cross slide 8 is moved forward or backward, and the tool post 4 is thus fed in the Y axis direction (i.e., the direction of the longitudinal axis of the bit 23a) into a workpiece W that is being rotated, so that the turning operation is performed by the tool 23 with its point of working set at a horizontal point of the workpiece W.

In order to replace one tool with another tool to be held by the tool post 4, first, the carriage 3 is moved to a position in which the exchanging arm 7 can reach the tool post 4, and the tool post 4 is turned around an axis parallel to the Y axis to 90 degrees. The exchanging arm 7 is then operated, to make sliding motions in the Z axis direction and rotations around the B axis, so that pulling out, exchanging and installing of the tool is performed.

In cases where a workpiece W to be worked has such a shape or feature as makes it impracticable to undergo a horizontal in-feed, the tool held by the tool post 4 is exchanged to the tool 22 by operating the exchanging arm 7. The tool 22 has the holder 22b and the bit 22a which is provided on the holder 22b and of which the longitudinal axis is tilted relative to that of the holder 22b. When the tool 22 held by the tool post 4 is indexed to a position in which the longitudinal axis of the holder 22b is parallel to the X axis direction, the longitudinal axis of the bit 22a become disposed in a position tilted away from the X axis direction closer to the direction of the horizontal Y axis. In operation, first, the tool 22 configured as described above is installed in the tool post 4, and the tool 22 held by the tool post 4 is indexed until the longitudinal axis of the holder 22b is oriented in a direction parallel to the X axis. Thereafter, the cross slide 8 is moved forward or backward, the lift 9 is moved upward or downward, and the tool post 4 is fed in a tilted direction (i.e., the direction of the longitudinal axis of the bit 22a) that is 45 degrees tilted with respect to the X axis direction (the direction of the longitudinal axis of the holder 22b) into a workpiece W that is being rotated, so that the turning operation is performed by the tool 22 with its point of working set at a slant point of the workpiece W.

In this way, the combination machining lathe 1 is configured to exchange one tool to another tool to be held by the tool post 4 in accordance with the weight, shape, and/or the like of the workpiece W and to change the in-feed direction of the tool post 4, so that a turning operation is performed with its point of working set at an optimum point.

As described above, with the combination machining lathe 1 according to the present embodiment, the in-feed direction is changed in accordance with the weight, shape and/or the like of the workpiece W, to perform a turning operation with its point of working set at a desirable point; for example, the horizontal point of the workpiece W can be set as its point of working, and thus the machining can be carried out with increased accuracy.

Furthermore, in order to change the in-feed direction of the tool post 4 according to this embodiment, it is necessary to simply replace the tool installed in the tool post 4 with an adequate tool such that the direction of the longitudinal axis of the bit is oriented in a desired in-feed direction when the tool is indexed to a position in which the longitudinal axis of the holder is oriented in the direction parallel to the X axis. Accordingly, the turning operation with the tool post 4 being fed in a desirable direction adapted according to the conditions can be performed even if a plurality of tool mount portions which hold a tool oriented in directions different from each other are not provided in the tool post 4, and thus such an adaptive combination machining lathe can be designed in a compact size as a whole.

Furthermore, according to the present embodiment, the direction of longitudinal axis of the bit can be changed by simply replacing one tool with another tool to be installed in the tool post 4 using the exchanging arm 7, and thus the operation for changing the direction of the longitudinal axis of the bit is simple. The exchanging arm 7 to be equipped for that purpose may be of a simple configuration such that the exchanging arm 7 is rotatable around the B axis parallel to the direction in which the tool 21, 22 or 23 is to be installed or pulled out, and thus the cost of equipment can be reduced.

The configurations of the combination machining lathe consistent with the present invention are not limited to the illustrated embodiments as described above, but it is to be understood that various modifications and changes may be made to the specific configurations of for example the tool post and the tool exchanger (comprised of an exchanging arm and a tool magazine in the above embodiment) and other components without departing from the scope of the present invention where appropriate.

Figure 5:
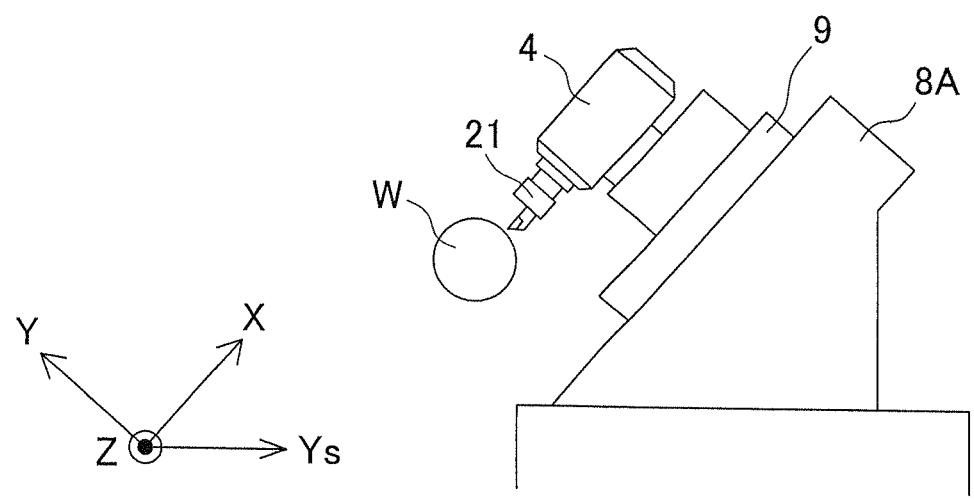
FIG. 5 is a schematic diagram showing a first exemplary modified embodiment of the combination machining lathe.

For example, in the combination machining lathe of the above-described embodiment, the front face of the cross slide is illustrated as a vertical surface and the vertical direction is defined as the X axis direction. However, the relevant surface of the cross slide may be sloped as shown in FIG. 5; that is, a cross slide 8A in an alternative embodiment applicable may have such a sloped front face on which the lift 9 is slidably mounted. It is to be noted that in this embodiment, the direction of the sliding motion of the lift 9 along the sloped front face of the cross slide 8A, that is tilted, corresponds to the X axis direction as defined in the appended claims. With this alternative embodiment of the combination machining lathe comprising the cross slide 8A having such a sloped front face, as well, the in-feed direction of the tool post 4 is changed by (1) replacing a tool held in the tool mount portion of the tool post to another tool different therefrom in the direction of the longitudinal axis of the bit with respect to that of the holder, and (2) causing the cross slide 8A and the lift 9 to be moved in a Ys axis direction and in the X axis direction, respectively, in combination, so that the point of working on the workpiece W can be changed.

Figure 6A:
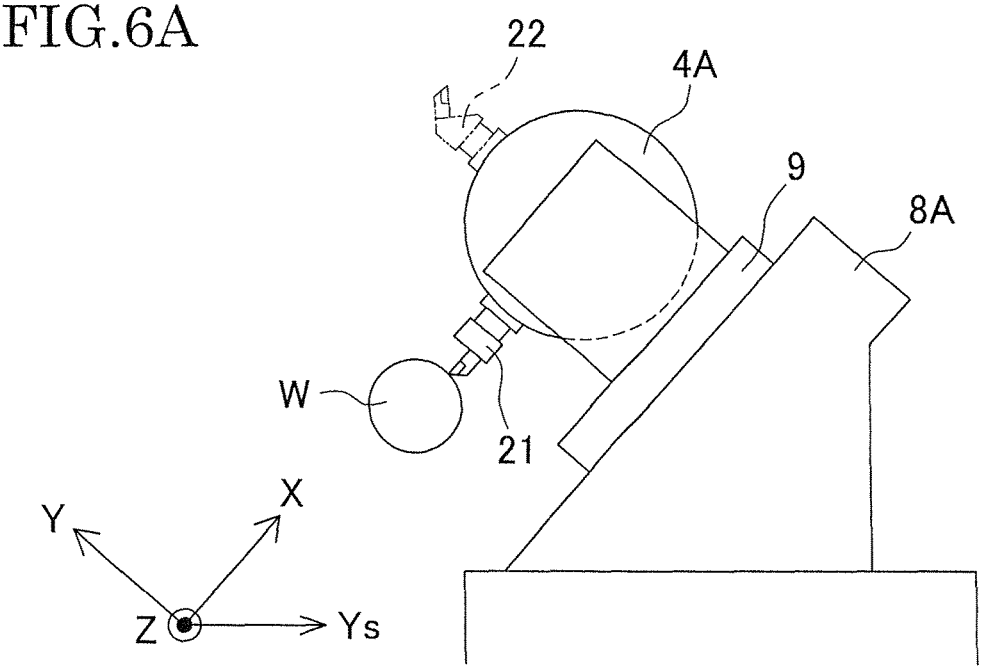
FIG. 6 is a schematic diagram showing a second exemplary modified embodiment of the combination machining lathe.
Figure 6B:
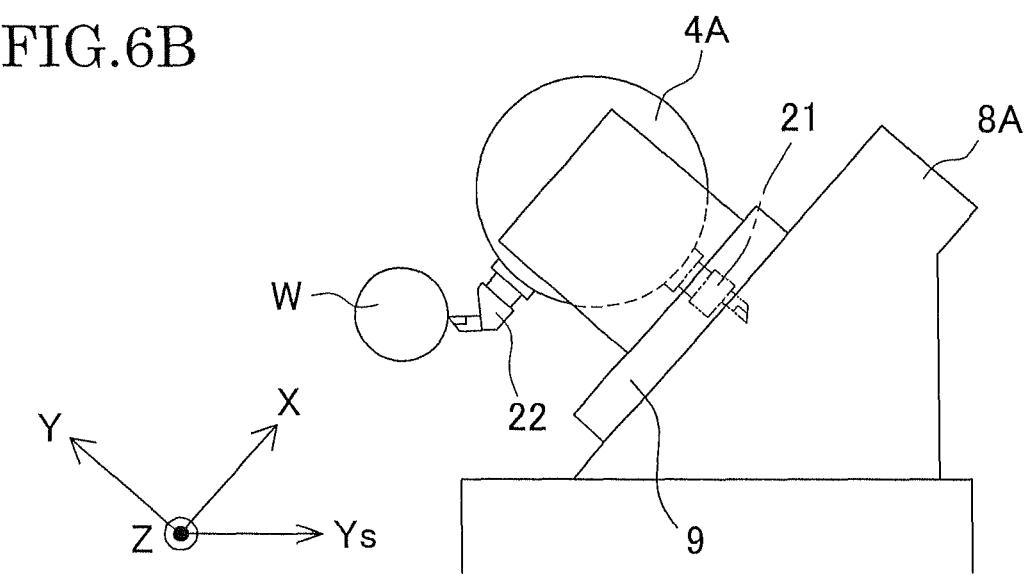
Figure 7:
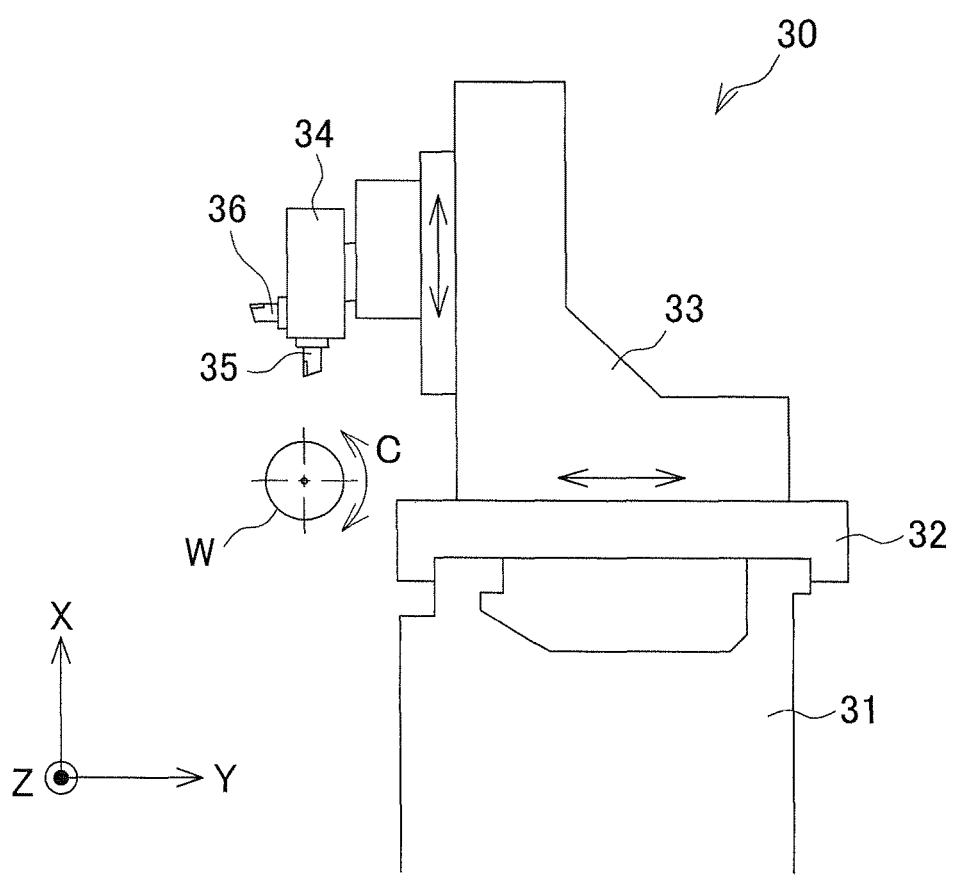
FIG. 7 is a schematic diagram showing a conventional combination machining lathe according to an applicant's own prior invention.

To realize a configuration which renders the longitudinal axis of the bit changeable to change the point of working on the workpiece W, the tool exchanger such as an exchanging arm, etc. may not necessarily be required in practice. For example, as shown in FIG. 6, a tool turret 4A may be provided at the tool post. The tool turret 4A is configured to be rotatable around an axis parallel to the Z axis direction. The tool turret 4A is rotated, and the tool is thus replaced with a desired tool different therefrom in the direction of the longitudinal axis of the bit with respect to that of the holder so that the desired tool is indexed to a position in which the longitudinal axis of the holder of the desired tool is oriented in the direction parallel to the X axis. In this way, the direction of the longitudinal axis can be changed to change the point of working on the workpiece W. The adoption of the configuration using the tool turret 4A obviates the need for the tool exchanger, thus serving the miniaturization of the combination machining lathe as a whole. Moreover, the tool turret 4A makes it possible to more swiftly exchange the tools in comparison with the tool, exchanger exchanging the tools, and thus increases the efficiency in operation.

Furthermore, when the in-feed direction is set, either of the sliding directions of the lift or the cross slide may be selected as the in-feed direction, so that only control over a single regulator (feed mechanism) can suffice to perform the in-feed operation. Therefore, the computing loads required actually for controlling the motor(s) or the like can be reduced, and potential errors in the amount of feed or the like can be reduced in comparison with an alternative mode of operation in which the both of the lift and the cross slide are moved to perform the in-feed operation. When it is desired to change the point of working to a point closer to the horizontal point of the workpiece, the in-feed direction may be set to be parallel to the Y axis direction perpendicular to the X axis and to the Z axis, so that such change can be effected only by exchanging the values of parameters X and Y at the NC unit 24. Therefore, the change of the in-feed direction can be carried out with increased ease.

Although the above-described embodiment is configured to provide an exchanging arm such that the direction in which a tool is inserted into or withdrawn from the tool post coincides with the Z axis direction, an exchanging arm may alternatively be provided such that the direction in which a tool is inserted into or withdrawn from the tool post coincides with the X axis direction. This alternative configuration obviates the necessity for rotating the tool post upon exchanging the tools, and thus makes it possible to further simplify the structure.

Moreover, although the above-described embodiment is configured to move the tool post, an alternative configuration may be possible in which a workpiece held by a workpiece holding device can be moved in the X axis direction, the Y axis direction and other directions. Similarly, another alternative configuration may also be possible in which a tool held by the tool post and a workpiece held by the workpiece holding device can both be moved in the X axis direction, the Y axis direction and other directions. Furthermore, means for moving the tool post may not be limited to the above-described specific embodiment; for example, a cross slide configured to be movable rightward and leftward may be mounted on a lift configured to be movable upward and downward.

In addition, the number of kinds of the tools may not be limited to three as in the above-described embodiment. For example, a tool comprising a holder and a bit of which the longitudinal axis forms a tilt angle of 30 degrees or 60 degrees with respect to that of the holder may be installed in the tool post, and in this instance, the tool post may be fed in a tilted direction corresponding to the direction of the longitudinal axis of the bit of the tool installed (for example, the tool post may be fed along a straight line tilted at an angle of 30 degrees or 60 degrees with respect to the horizontal surface).

Besides, a workpiece holding device may be embodied in a different configuration, although the above-described embodiment is configured to have a head stock and a tail stock operating in combination; for example, a mechanism in which two opposed main spindles are used to hold the both ends of a workpiece may be adopted. Furthermore, the relative movement of the tool and the workpiece in the Z axis direction may be made by moving the workpiece holding device. Likewise, the configuration of the combination machining lathe consistent with the present invention is not limited to the above-described specific embodiment.

The invention claimed is:

1. A combination machining lathe comprising:
a workpiece holding device configured to hold a workpiece in a manner that permits the workpiece to rotate around an axis parallel to a direction of a horizontal Z axis;
a tool post having a tool mount portion configured to hold a first tool, the first tool comprising a first holder and a first bit, the first holder having a longitudinal axis extending lengthwise, and being held by the tool mount portion of the tool post, the first bit being provided at an end, lengthwise, of the first holder, where a longitudinal axis of the first bit is angled with respect to the longitudinal axis of the first holder, at least one of the tool post and the workpiece holding device being configured to be movable to allow relative movement of the first tool held by the tool mount portion of the tool post and the workpiece held by the workpiece holding device in three directions of an X axis, a Y axis and the Z axis, the X axis being perpendicular to the Z axis, the Y axis being perpendicular to the Z axis and to the X axis, the tool post being configured to perform an operation of indexing the first tool held by the tool mount portion of the tool post to a position in which the longitudinal axis of the holder is parallel to the X axis direction;

a controller configured to index the first tool to a position where the axis of the first holder held by the tool mount portion of the tool post is parallel to the X axis, and the axis of the first bit at the end of the first holder is angled with respect to the X axis in an X-Y plane, and to control the relative movement of the first tool and the workpiece so that the first tool is fed in the axis direction of the first bit into a workpiece that is being rotated, with the axis of the first holder maintained parallel to the X-axis; and a tool exchanger for use in replacing the first tool held by the tool post with a second tool, the second tool comprising a second holder having a longitudinal axis and a second bit having a longitudinal axis, wherein a longitudinal axis of the tool post is co-axial with the longitudinal axis of the first holder;

wherein the tool exchanger is configured to replace the first tool with the second tool such that an angle between the longitudinal axis of the second bit of the second tool and the longitudinal axis of the second holder of the second tool is different from an angle between the longitudinal axis of the first bit of the first tool and the longitudinal axis of the first holder of the first tool;

wherein the controller is configured to index the tool post to a position where the longitudinal axis of the second holder of the second tool is parallel to the X axis, and, after replacing the first tool with the second tool, the controller is configured to change a direction of relative movement of the second tool and the workpiece from along the longitudinal axis of the first bit of the first tool to along the longitudinal axis of the second bit of the second tool, and wherein the longitudinal axis of the second bit is angled in the X-Y plane relative to the X axis and a horizontal plane.

2. The combination machining lathe according to claim 1, wherein the tool exchanger comprises an exchanging arm configured to be slidable in the direction of the Z axis and rotatable around a B axis parallel to the Z axis.

3. The combination machining lathe according to claim 1, further comprising a tool magazine configured to store a plurality of tools.

* * * * *